United States Patent [19]
Gallo et al.

[11] Patent Number: 5,612,831
[45] Date of Patent: Mar. 18, 1997

[54] REMOVEABLE MEDIA DRIVE UNIT WITH LOADER INTERLOCK TO INDICATE PRESENCE OF OBJECT

[75] Inventors: Frank D. Gallo; Hartmut E. Hausler; Paul Y.-F. Hu; Kevin K. Kartchner, all of Tucson, Ariz.; Scott M. Rockwell, Aurora, Colo.; Stephen J. Roffinoli; James C. Simkins, both of Tucson, Ariz.

[73] Assignee: International Business Machines Corporation, Armonk, N.Y.

[21] Appl. No.: 530,799

[22] Filed: Sep. 20, 1995

[51] Int. Cl.⁶ .................................................. G11B 15/18
[52] U.S. Cl. ...................... 360/71; 360/74.6; 369/77.2; 369/178
[58] Field of Search .............................. 360/69, 71, 74.1, 360/74.5, 74.6, 88, 90, 93, 96.1, 96.5, 99.02, 99.06; 369/52, 53, 58, 75.1, 75.2, 76, 77.1, 77.2, 178, 179

[56] References Cited

U.S. PATENT DOCUMENTS

| | | | |
|---|---|---|---|
| 5,105,317 | 4/1992 | Sugiyama et al. | 360/71 |
| 5,313,344 | 5/1994 | Sakaguchi et al. | 360/71 |
| 5,365,383 | 11/1994 | Miller et al. | 360/71 X |
| 5,452,149 | 9/1995 | Kim | 360/71 |

*Primary Examiner*—Andrew L. Sniezek
*Attorney, Agent, or Firm*—D. A. Shifrin

[57] ABSTRACT

An interlock system is provided for removable-media drive unit to prevent the drive loader from attempting to pull in and mount a data cartridge before it is released by a mechanical gripper or human hand. The interlock system includes a light source and a photodetector positioned in front of the drive on opposite sides of the path cartridge takes when it is being inserted or removed from the drive loader. The presence of the cartridge, gripper or other object in the path interrupts a light beam from the light source thereby signalling the drive controller to disable the drive loader. When the gripper has released the cartridge and withdrawn, or when the path is otherwise clear, the photodetector again detects the light beam and signals the drive controller that the loader can be safely enabled. In one embodiment, the light source and photodetector are mounted on a card which plugs into the face of the drive. The presence of the card indicates to the drive controller that the drive is installed in a library environment and causes the drive controller to execute appropriate program code to interpret signals from the photodetector and enables and disables the drive loader in response.

3 Claims, 7 Drawing Sheets

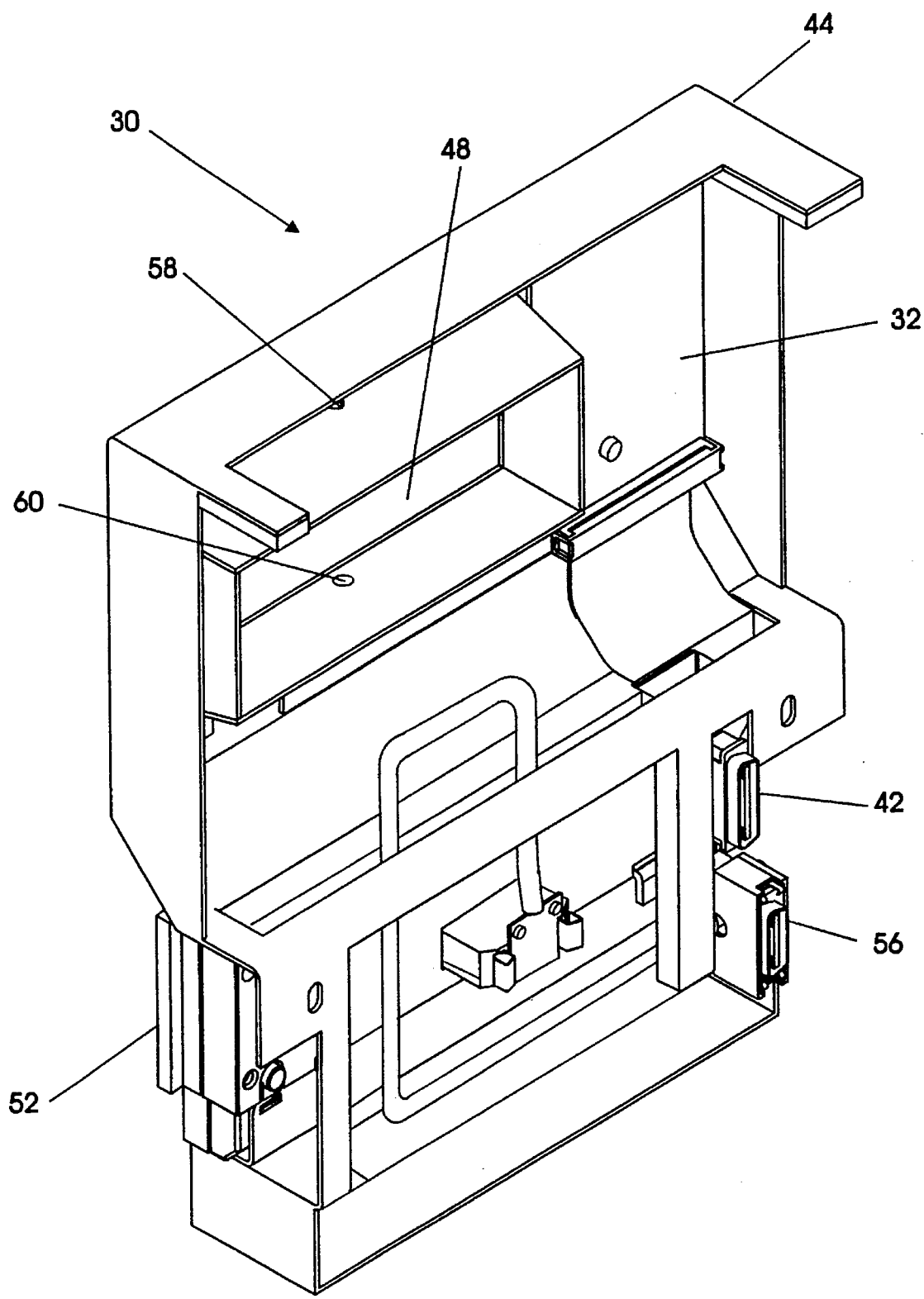

REMOVEABLE MEDIA DRIVE UNIT WITH LOADER INTERLOCK TO INDICATE PRESENCE OF OBJECT

TECHNICAL FIELD OF THE INVENTION

The present invention relates to removable-media storage drives, and in particular, to an interlock and interface for indicating to a drive the presence of an automated gripper or other object-proximate to the front of the drive.

BACKGROUND OF THE INVENTION

An automated storage and retrieval system includes one or more banks of storage cells, used for retaining stored items, one or more mechanical accessors, used to transport an item to and from a storage cell, and a controller. In an information library, for example, the stored items are recording media (such as magnetic tape cartridges or cassettes or optical cartridges, magazines or open trays holding one or more optical disks, collectively referred to herein as "cartridges"). The accessor transports cartridges between the storage cells and one or more data drives which read information from or write information to the media.

To mount a cartridge in a drive, a gripper on the accessor inserts the cartridge into a loader throat and releases its grip. The drive loader then "pulls" the cartridge into the drive and prepares to access the media. Conversely, when the drive has completed accessing the media, the loader "pushes" the cartridge partially out of the loader throat allowing the gripper to grip the cartridge, remove it from the loader throat and transport it to a storage cell. During a load operation, it is important that the drive loader be activated only after the gripper has released the cartridge. Conversely, during an unload operation, it is important that the gripper grasp the cartridge only after the drive loader has completed its action. If the gripper and the loader attempt to retain control over the cartridge simultaneously, a tug-of-war between the two occurs creating an error situation and, on occasion, causing damage to the drive or the gripper.

One proposed solution is for the drive loader and the accessor gripper to communicate with each other through a library controller. The gripper transmits a signal over a bus indicating that the cartridge is in the loader throat and is available to be pulled in. Upon receipt of the signal from the gripper, the loader, in turn, transmits a reply signal back to the gripper indicating that the loader is ready to pull the cartridge in and requesting that the gripper release the cartridge. In response, the gripper transmits a signal to the loader confirming that it has released the cartridge, whereupon the loader pulls the cartridge in for mounting. A similar set of signals is exchanged when the cartridge is to be unloaded. Such a solution, however, requires a substantial amount of bus activity, thereby degrading accessor and drive performance. Performance would be degraded further in a library having many drives and several accessors in which the exchange of signals along a library bus can be difficult to prioritize and coordinate.

Another proposed solution is for the gripper to release its grip as the cartridge is placed into the loader slot and push the cartridge in until it engages the loader (similar to the manner in which a video cassette is loaded into a VCR). However, the process of unloading a cartridge would still require an exchange of signals between the loader and the gripper or the risk of a-tug-of-war remains.

OBJECTS AND SUMMARY OF THE INVENTION

In view of the foregoing, it is an object of the present invention to provide an interlock system for a drive unit installed in an automated storage and retrieval library to disable the drive loader until the accessor gripper has released the data cartridge and withdrawn from the loader throat.

It is another object to provide such an interlock system which does not require communications between the drive logic controlling the loader and the library logic controlling the accessor gripper.

It is a further object to provide such an interlock system which can be installed on a drive and in drive-associated logic and which, by its presence, indicates to the drive that the drive is installed in a library environment.

These and other objects are achieved in this invention by providing a sensor which plugs into and is powered by a drive to detect the presence of an object, including the library gripper, in the loader throat in front of the drive. The sensor transmits a signal to the drive controller which, in turn, disables the drive loader to prevent the loader from attempting to pull a cartridge from the gripper before the gripper has released the cartridge. When the gripper or other object has withdrawn from the throat, the sensor transmits another signal to the drive controller which enables the drive loader.

In one embodiment of the present invention, the presence of the sensor plugged into the drive indicates to the drive controller that the drive is in a library environment while the absence of the sensor indicates that the drive is in a stand alone or automated cartridge feed (ACF) environment.

The foregoing and other features and advantages of the invention will be apparent from the following more particular description of preferred embodiments of the invention, as illustrated in the accompanying drawings.

BRIEF DESCRIPTION OF THE DRAWINGS

FIG. 4 is a rear perspective view of the assembled present invention; and

DETAILED DESCRIPTION OF THE INVENTION

Figure 1A:
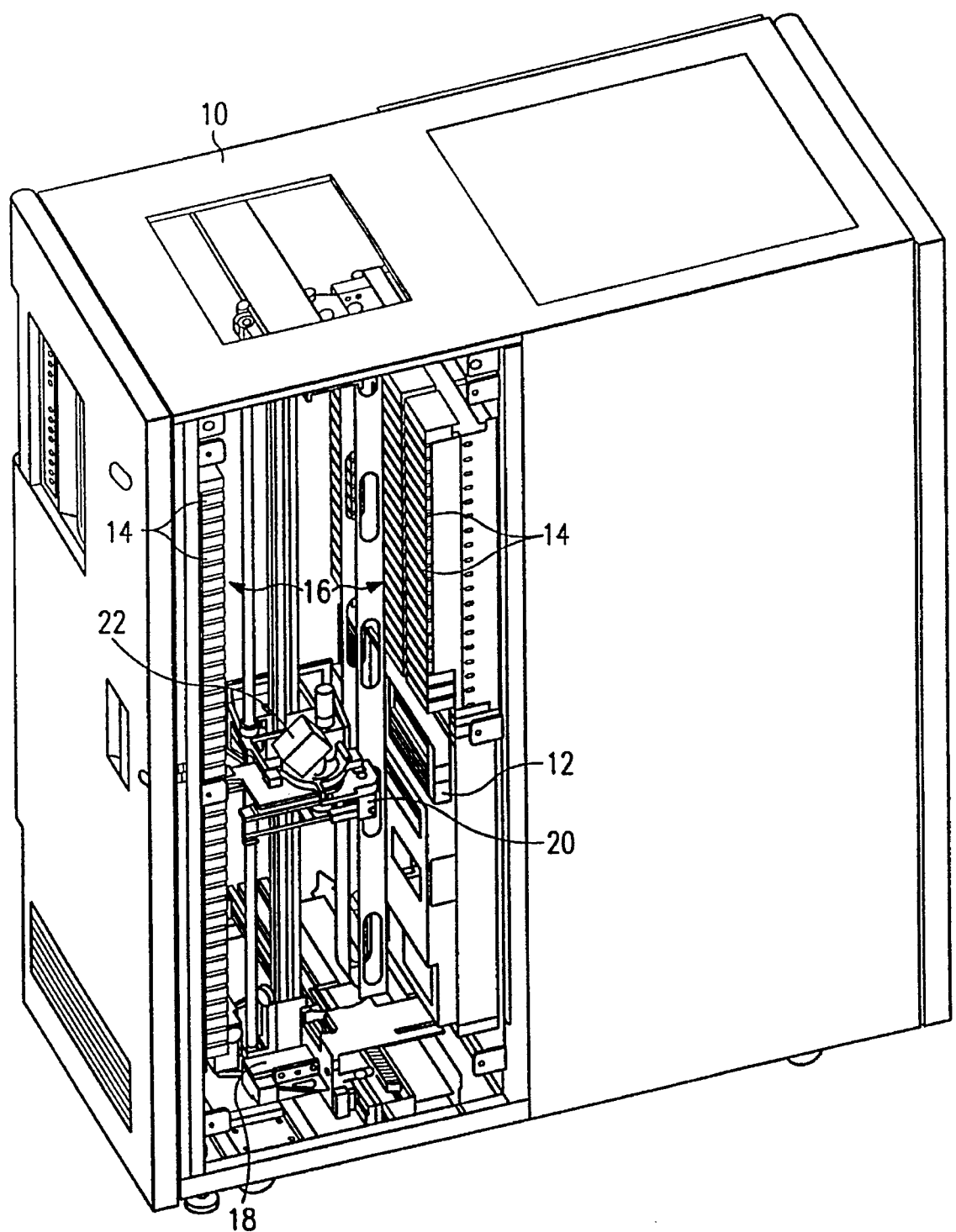
FIGS. 1A and 1B are front and rear perspective views, respectively, of an automated storage and retrieval system in which the present invention can be employed.
Figure 1B:
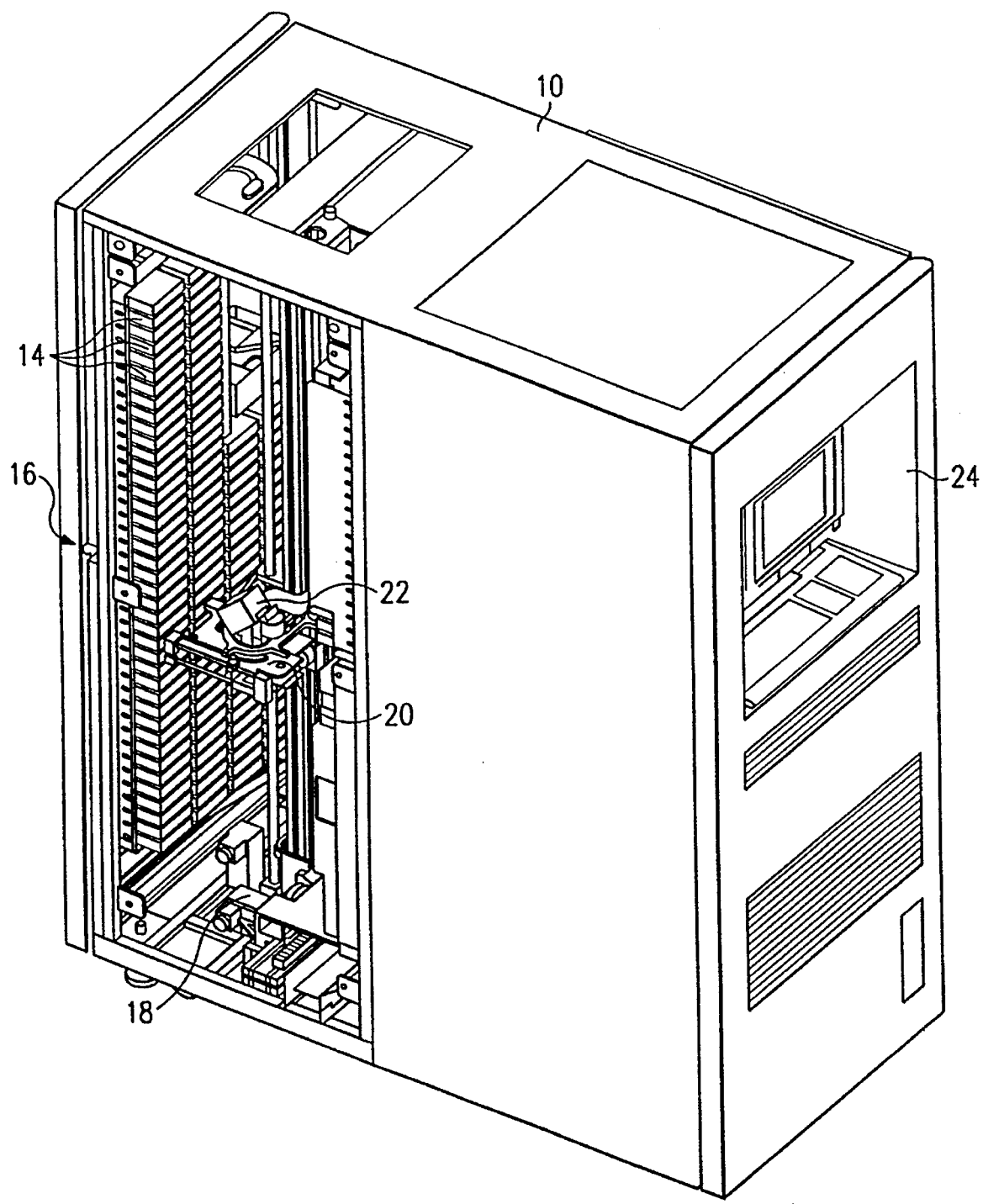

FIGS. 1A and 1B are views of an automated information storage and retrieval library 10 employing the interlock system of the present invention. The library 10 includes one or more drives 12, a plurality of cartridges 14 stored in banks of cells 16, an accessor 18 for transporting a selected cartridge 14 between a storage cell 16 and a drive 12. The accessor 18 includes a cartridge gripper 20 and, in some models, a bar code scanner or other vision system 22 mounted on the gripper 20. The drives 12 can be optical disk drives, optical or magnetic tape drives or drives for any other type of removable media, and the cartridges can contain media appropriate to the drives. The library 10 also includes a library controller 24 interconnected with, and controlling the actions of, the drives 12 and the accessor 18. The controller 24, which includes at least one computing processor, is further interconnected with a host processor (not shown) from which it receives access commands; information to be recorded on, or to be read from, selected cartridges 14 is transmitted between the drives 12 and the host 26 through the library controller 24 or directly between the drives 12 and the host.

Figure 2A:
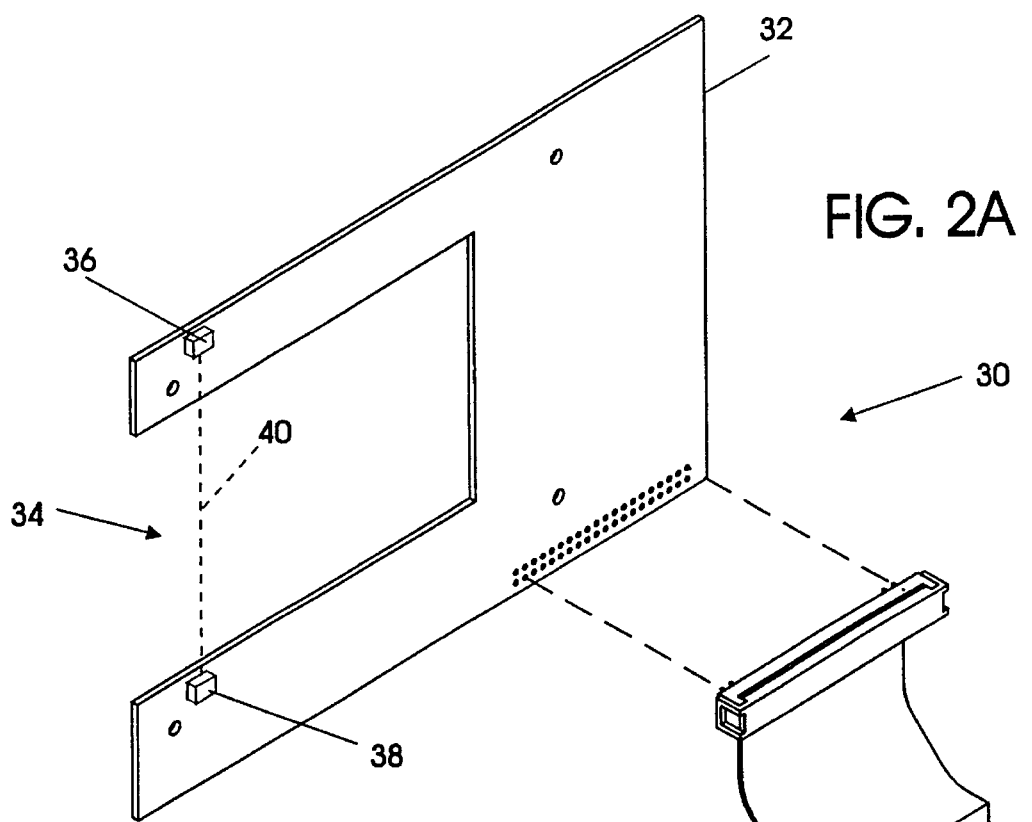
FIGS. 2A and 2B are rear and front perspective views, respectively, of the present invention.
Figure 2B:
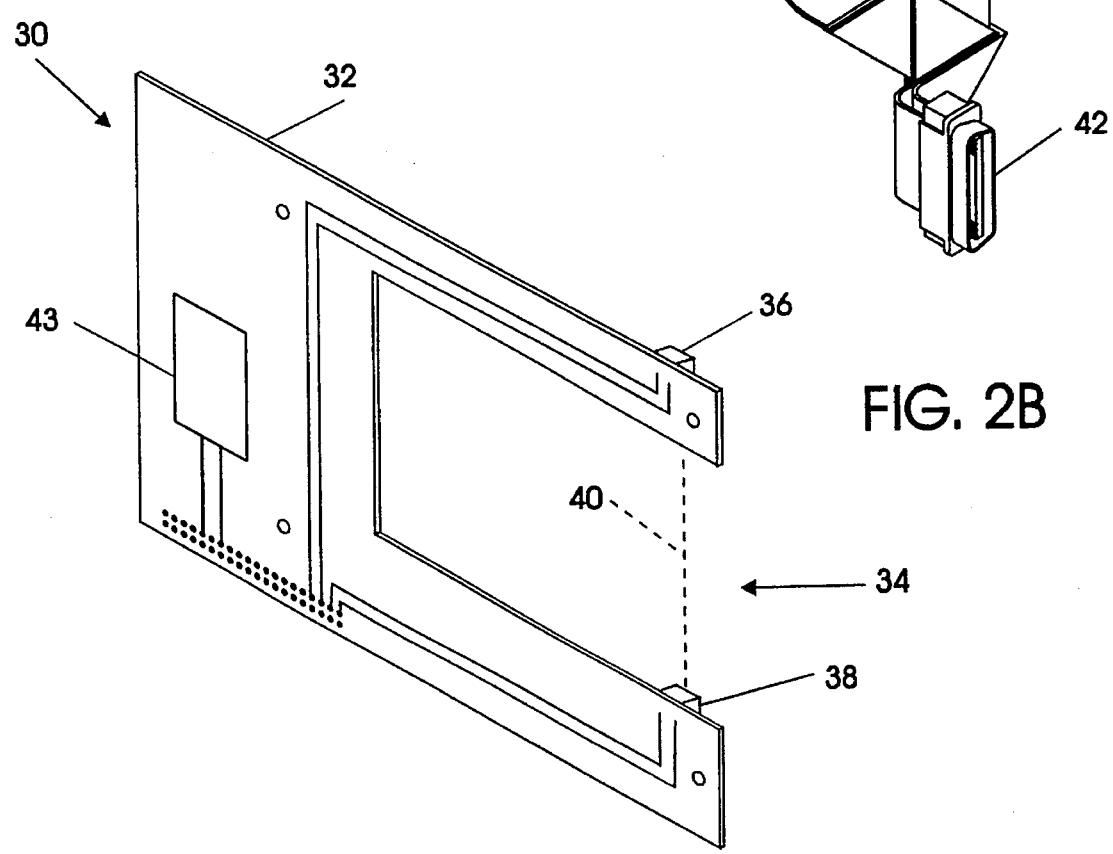

FIGS. 2A and 2B are rear and front perspective views, respectively, of the one embodiment of the interlock system 30 of the present invention. The interlock system 30 includes a rigid circuit card 32 having a cut-out 34 corresponding to the loader throat in the drive unit 12 through which cartridges 14 are loaded and unloaded. A light source 36, such as a light emitting diode, and a photodetector 38 are mounted on opposite sides of the cut-out 34 so that a light beam (represented by the dashed line 40) is projected across the cut-out 34. The light source 36 and photodetector 38 are connected to terminals of a connector 42. Additionally, the interlock system 30 includes a circuit 43 on the card 32 which is also connected to the connector 42.

Figure 3:
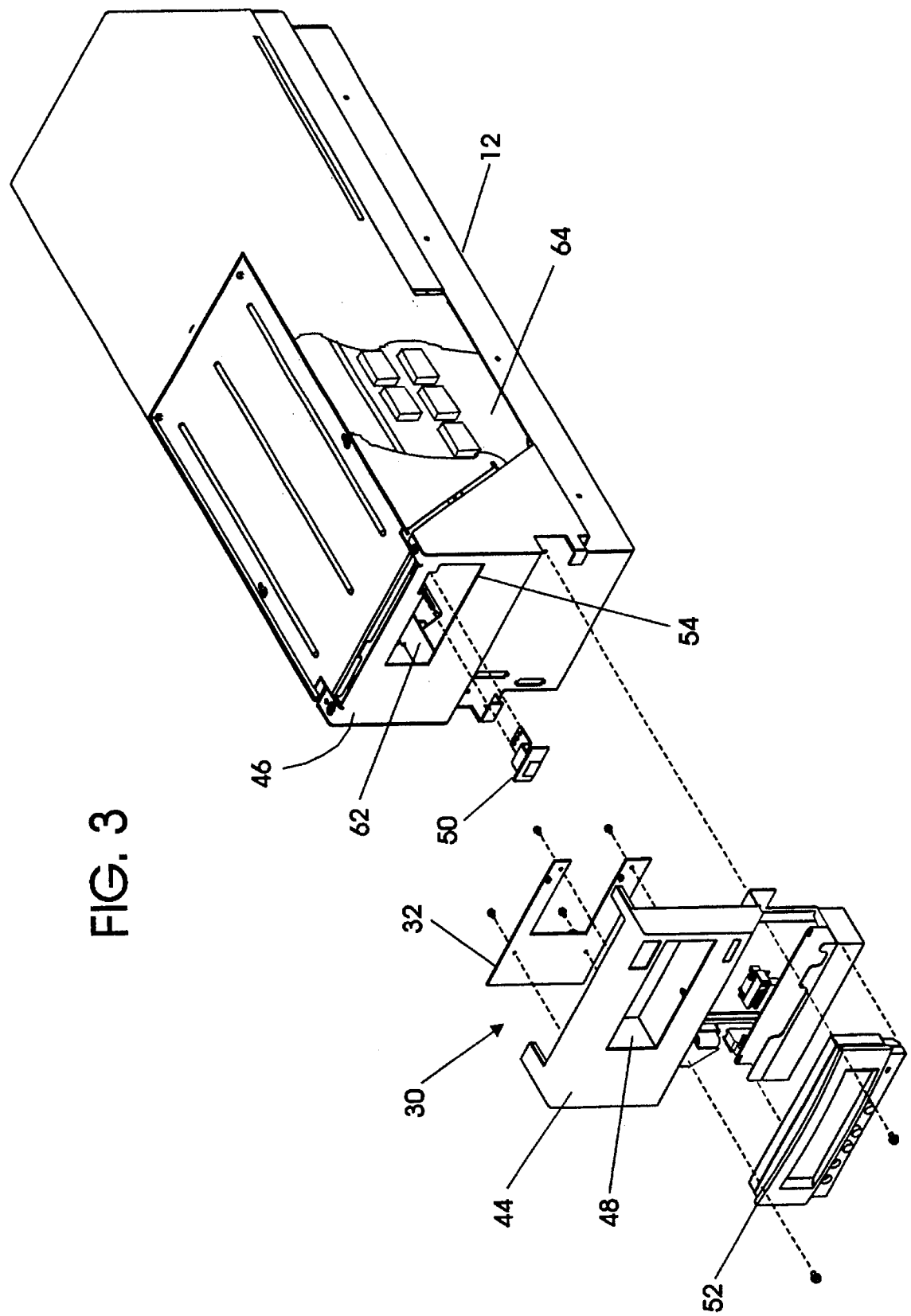
FIG. 3 is an exploded perspective view of a drive unit with the present invention.

FIG. 3 is an exploded perspective view of a drive unit 12 in which the interlock system 30 of the present invention has been installed. The drive unit 12 includes a cartridge loader 62, a drive controller 64 (partially shown through a cut-away section of the drive housing) to monitor and direct all aspects of the operation of the drive 12, and a drive cover 44 affixed to the front face 46 of the drive 12. The drive cover 44 has a loader throat 48 and a connector 50, for mating with the connector 42 on the card 32. The terminals of the connector 50 are connected to the drive controller 64. Inside the drive 12 but not shown in the FIG. are a media read/write head, read/write channels and one or more input/output interfaces for interconnecting the drive 12 to a host device and, when the drive 12 is installed in the library 10, for interconnecting the drive 12 to the library controller 24.

A display module 52 can be secured to the drive cover 44 for providing information, such as the status of the drive 12, to an operator. The front face 46 of the drive 12 has an opening 54 which is a continuation of the loader throat 48. When all of the elements are assembled, the cut-out 34, the loader throat 48 and the opening 54 in the front face 46 are aligned to permit a cartridge to be inserted into and removed from the drive 12.

FIG. 4 is a rear perspective of the assembled drive cover 44 with the interlock system 30 and display module 52 secured thereto. Shown in this view is a connector 56 to which the display module 52 is connected and which is matable with a corresponding connector on the front face 46 of the drive 12. Also shown are holes 58 and 60 in the cover 44 through which the light beam 40 passes across the cut-out 34 and the loader throat 48.

Figure 5A:
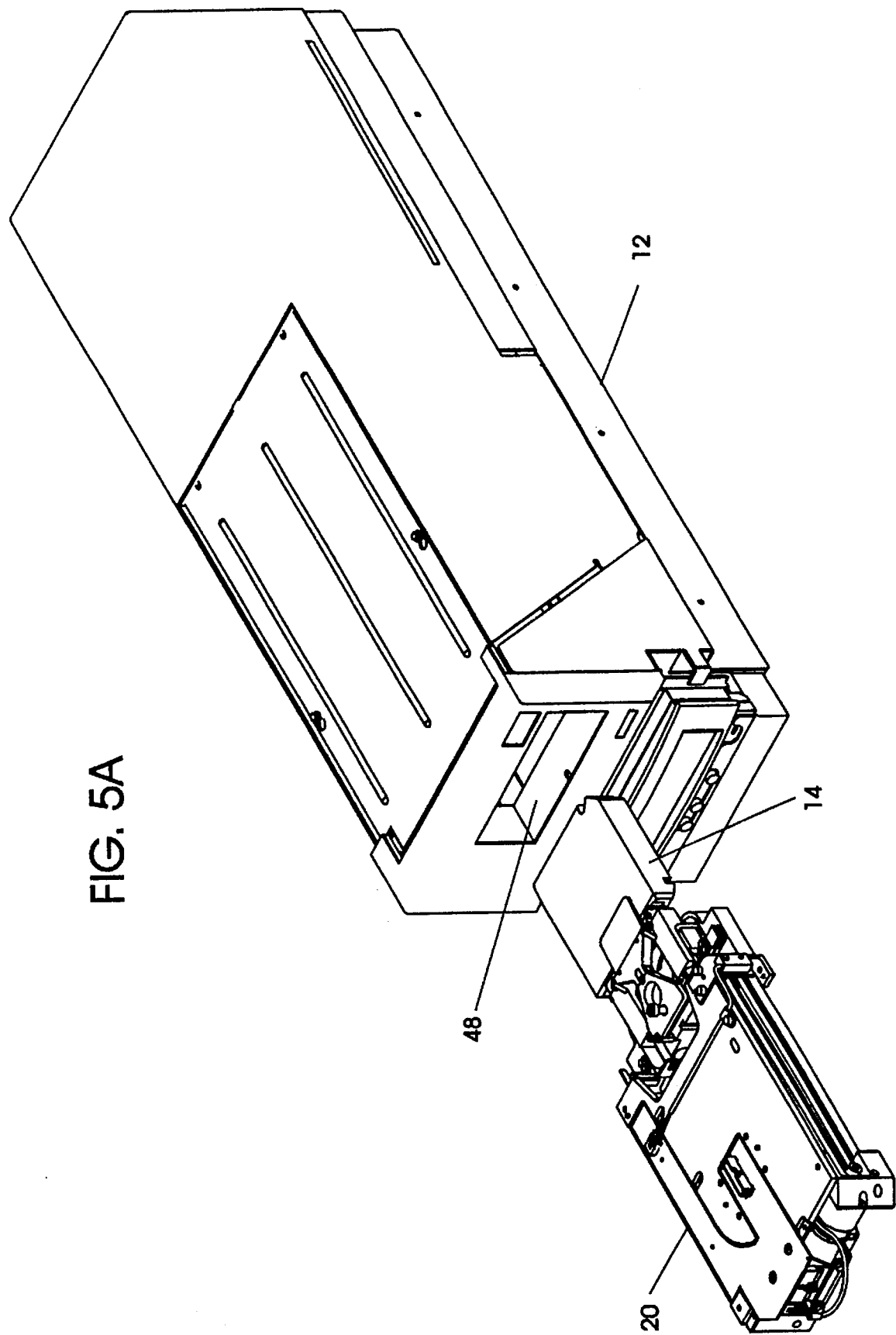
FIGS. 5A and 5B are front perspective views of a drive, accessor and media cartridge with the gripper holding the cartridge in front of the drive and with the gripper passing the cartridge into the drive, respectively.
Figure 5B:
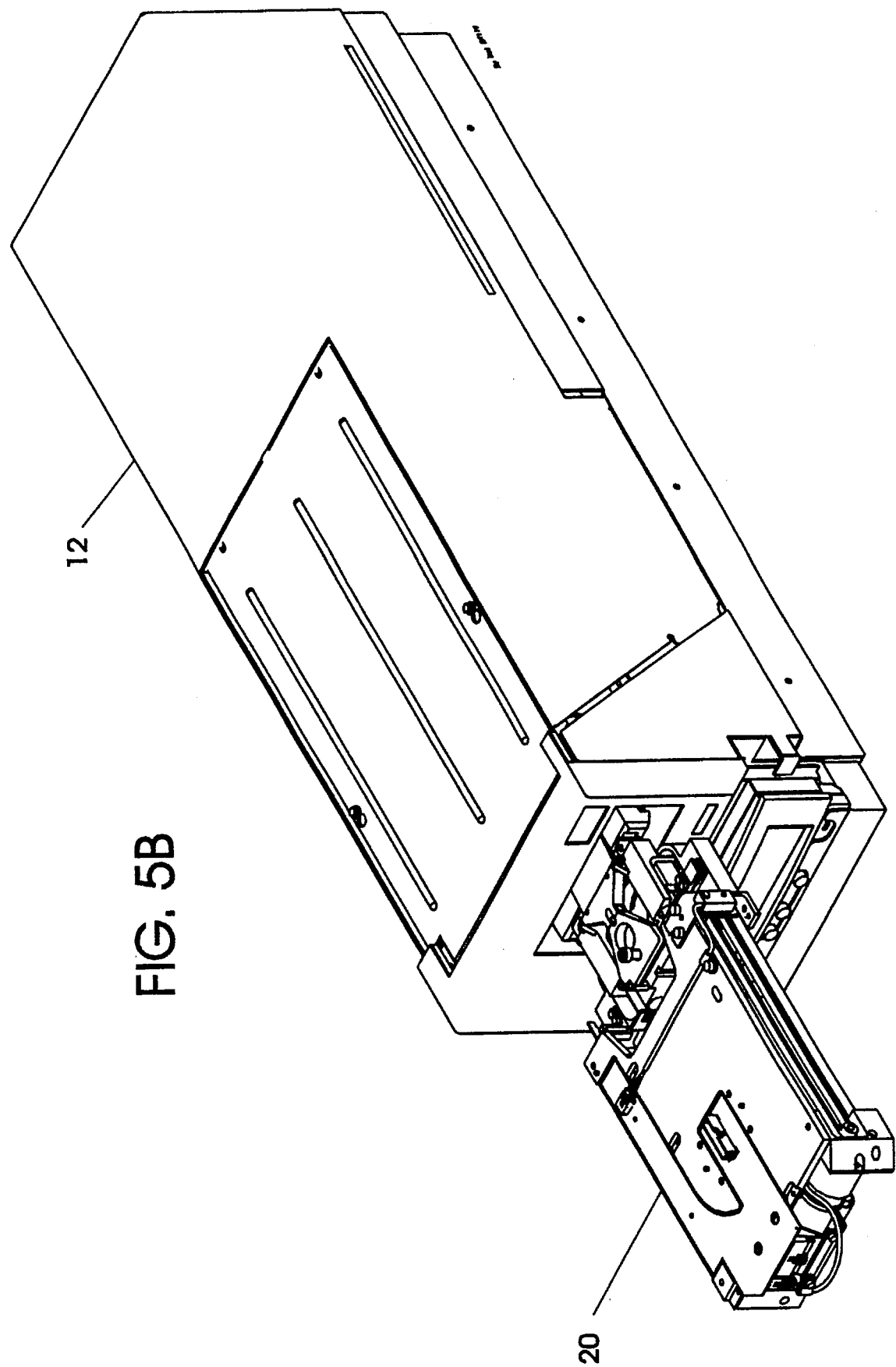

In operation, as illustrated in FIGS. 5A and 5B, the gripper 20 with the cartridge 14 approaches the loader throat 48 (FIG. 5A). When the cartridge 14 enters the loader throat 48, the cartridge 14 interrupts the light beam 40. The photodetector 38 transmits an "object-present" signal to the drive controller 64 which, in response, directs the drive loader tray to move to the unload position if it is not already in that position. Thus, the drive loader 62 is effectively disabled from prematurely attempting to draw in and mount the cartridge 14. When the cartridge 14 is fully inserted into the loader 62, the cartridge 14 triggers a sensor on the loader 62 which transmits an "insertion-complete" signal to the drive controller 64. However, at this point in the process, a portion of the gripper 20 remains in the throat 48 with the light beam 40 interrupted and the loader remains disabled. After the cartridge 14 is fully inserted, the gripper 20 is withdrawn from the throat 48. Only when the gripper 20 has been fully withdrawn will the path of the light beam 40 be restored and the light detected by the sensor 38. The object-present signal from the sensor 38 changes to a "safe-to-load" signal in response to which the drive controller 64 enables the drive loader 62 and allows the cartridge 14 to be mounted and the media accessed. The object-present signal from the sensor 38 can comprise a digital signal of one state and the safe-to-load signal be of the opposite state but it will be appreciated that other signals can be employed including the presence and absence of current from the sensor 38. It will also be appreciated that the light source 36 and detector 38 can be interconnected to the connector 42 through driver and amplifier circuits, respectively.

The light source 36 receives its power from the drive controller 64 through the connectors 50 and 42. The circuit 43 can be comprised of a jumper wire between two specific terminals of the connector 42 or between one terminal and a ground point. When the connector 42 is plugged into the corresponding connector 50 on the drive face 46, the drive controller 64 interprets-the circuit 43 to indicate that the drive 12 is installed in a library environment. If the drive 12 is in a stand alone or ACF environment, the absence of the circuit 43 (or the presence of a different circuit) indicates this to the drive controller 64. The presence of the circuit 43 allows the drive controller 64 to execute control code which interprets the signals from the photodetector 38 and enables and disables the drive loader 62 in response.

While the invention has been particularly shown and described with reference to preferred embodiments thereof, it will be understood by those skilled in the art that various changes in form and details may be made therein without departing from the spirit and scope of the invention. For example, the present invention can also be employed with a drive in a stand alone environment to prevent a tug-of-war between the drive loader and a human operator. And, the light source and photodetector can be secured directly to the drive face and hard wired to the drive controller.

What is claimed is:

1. A drive unit for removable media cartridges, comprising:

a loader to receive a cartridge;

means for reading information from media in a loaded cartridge;

a drive housing having a front face, said face having a loader throat through which a cartridge can be inserted into and removed from said loader;

a light source mounted in front of said face for projecting a light beam across said loader throat;

a photodetector mounted in front of said face and aimed across the loader throat toward said light source operable to generate an object-present signal when the light beam is interrupted;

a drive controller responsive to said object-present signal and operable to prevent said loader from attempting to load a cartridge when said drive controller receives the object-present signal;

a card on which said light source and photodetector are mounted, said card being mountable on said housing face when the drive unit is installed in an automated storage and retrieval library having an accessor gripper for inserting and removing media cartridges into and from said loader;

a first connector mounted on said card and pluggable into a corresponding second connector mounted on said housing face, said first connector being interconnected with said photodetector and said second connector being interconnected with said drive controller; and a circuit on said card and interconnected with said first connector for indicating to said drive controller that the drive unit is mounted in the automated storage and retrieval library.

2. The drive unit of claim 1, wherein said drive controller comprises means for directing a loader tray in said loader to translate into an unload position when said drive controller receives the object-present signal from said photodetector.

3. An interlock system for a drive unit for removable media cartridges, comprising:

a circuit card mounted in front of a front face of the drive unit, the face having an opening through which a cartridge can be inserted into and removed from a loader in the drive unit;

a light source mounted on said circuit card for projecting a light beam across the opening;

a photodetector mounted on said circuit card aimed across the opening toward said light source and operable to generate an object-present signal when the light beam is interrupted;

a first connector mounted on said circuit card and pluggable into a corresponding second connector mounted on the face of the drive unit, said first connector being interconnected with said photodetector and said second connector being interconnected with a drive controller in the drive unit, whereby the drive controller, in response to the object-present signal, prevents the loader from attempting to load a cartridge; and a circuit on said card and interconnected with said first connector for indicating to the drive controller that the drive unit is mounted in an automated storage and retrieval library.

* * * * *